United States Patent Office 3,119,958
Patented Jan. 28, 1964

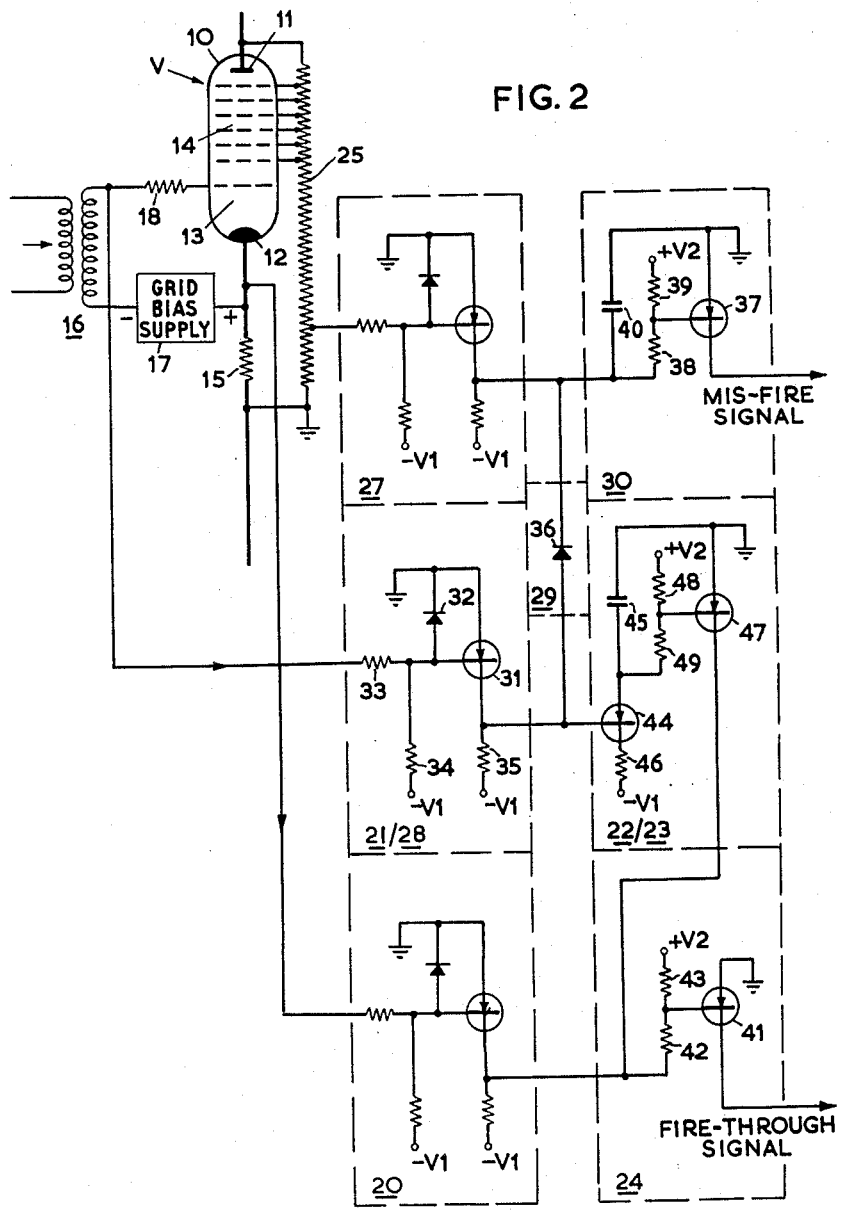

1

3,119,958
DETECTION OF FIRE-THROUGH IN MERCURY
ARC RECTIFIER AND INVERTER SYSTEMS
John Desmond Ainsworth, Stafford, England, assignor to
The English Electric Company Limited, London, England, a British company
Filed Dec. 21, 1960, Ser. No. 77,320
Claims priority, application Great Britain Jan. 1, 1960
10 Claims. (Cl. 321—12)

This invention relates to the detection of fire-through in mercury arc rectifier and inverter systems and is particularly concerned with the detection of fire-through in individual valves of a mercury arc rectifier or inverter, hereinafter collectively referred to as a mercury arc converter.

Fire-through when applied to the valve itself as opposed to a complete converter refers to the condition where, in a "broad pulse" system, current exists in the valve when the grid pulse supply is negative, except that where this exists during commutation, it should be ignored. A "broad pulse" system is defined as one in which the grid pulse is contiguous in time with the nominal conduction period of the valve, ignoring commutation time.

According to one feature of the invention, apparatus for the detection of fire-through in the valve of a mercury arc converter in a broad-pulse system comprises first circuit means for generating an electrical signal in response to a negative control grid pulse on the valve, the said signal being still present for a period after the said grid pulse has ceased and the said period being in excess of the converter's normal commutation time, second circuit means for generating an electrical signal having a condition indicating a cathode current in excess of some small fraction of normal cathode current, detector means sensitive to both the said signals and operative to detect when the delayed signal is generated simultaneously with the signal indicating the existence of the said excess cathode current, and relay means for controlling an indicator or protective device in response to the operation of the detector means.

According to another feature of the invention, apparatus for the detection of mis-fire and fire-through in the valve of a mercury arc converter in a broad-pulse system comprises first circuit means for generating an electrical signal having a condition indicative of the magnitude of the anode to cathode voltage relative to the minimum value normally required to fire the valve, second circuit means for generating an electrical signal having a condition indicating that the grid to cathode voltage of the valve is more positive than the normal minimum grid to cathode voltage for firing the valve and including a current limiting resistor for connection to the grid supply circuit of the valve and an amplifier-limiter connected to be supplied from the input end of this resistor, third circuit means for generating an electrical signal in response to a negative control grid pulse on the valve, the last-mentioned signal being still present for a period after the said grid pulse has ceased and the said period being in excess of the converter's normal commutation time, and including an amplifier-limiter, fourth circuit means for generating an electrical signal having a condition indicating a cathode current in excess of some small fraction of normal cathode current, first detector means sensitive to the output signals of the said first and second circuit means and operative when the said signals simultaneously have conditions indicating respectively an anode to cathode voltage and a grid to cathode voltage in excess of the respective normal minimum voltages for firing, time-delay relay means for controlling an indicator or protective device in response to the operation of the said first detector

2 means when the latter operation is sustained for a period in excess of the normal firing delay of the valve, second detector means sensitive to the output signals from the said third and fourth circuit means and operative to detect when the said delayed signal is generated simultaneously with the signal indicating the existence of the said excess cathode current, and relay means for controlling an indicator or protective device in response to the operation of the said second detector means, a common amplifier-limiter being employed for the said second and the said third circuit means.

A preferred form of apparatus according to the invention, applied to a mercury arc rectifier installation will now be described by way of example with reference to the accompanying drawings, in which:

FIG. 2 is a detailed circuit diagram thereof.

Figure 1:
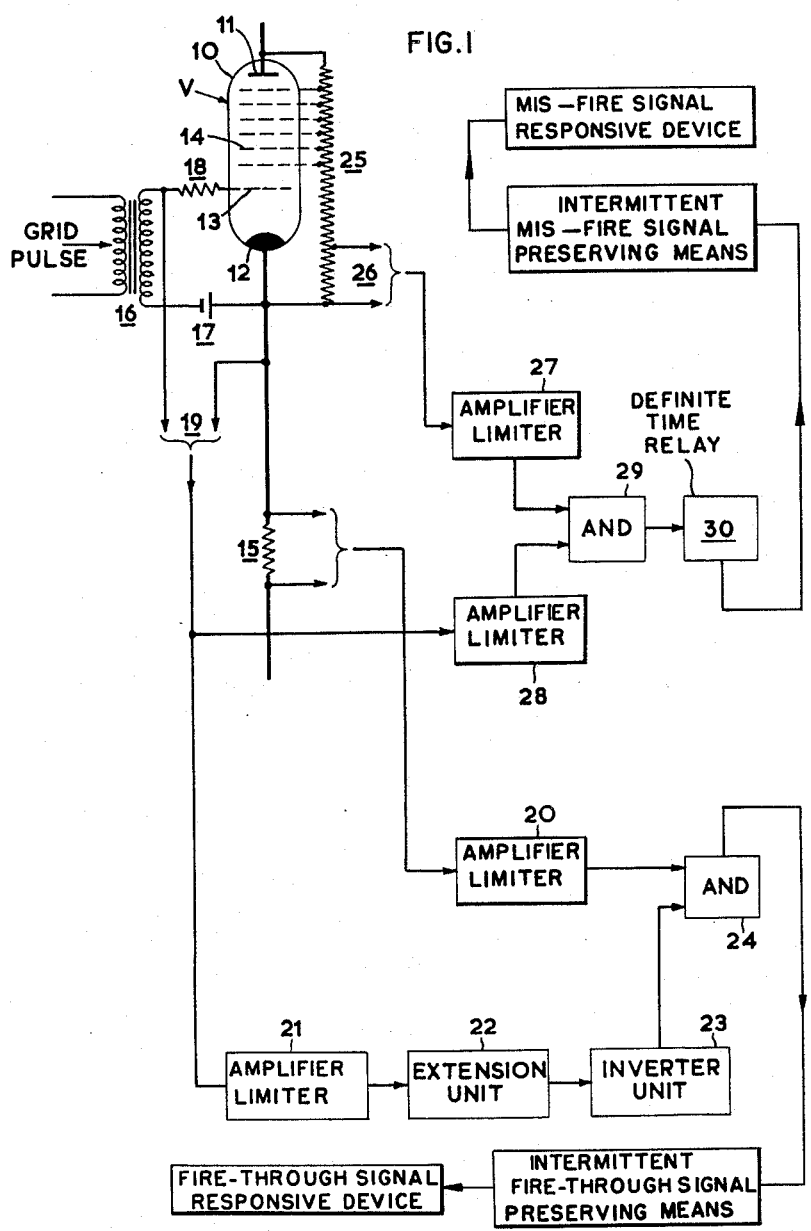
FIG. 1 is a block schematic diagram of the apparatus.

Referring to FIG. 1 a valve V in a mercury arc rectifier installation is shown schematically by an envelope 10 housing an anode 11, a cathode 12 formed by a pool of mercury, and a series of grids comprising a firing control grid 13 and voltage grading grids 14. The valve has its anode to cathode circuit connected in some suitable manner, not shown in the drawing, but the circuit includes a series resistor 15 from which a signal which is a measure of the potential drop across this resistor is derived to provide an indication of the cathode current. The valve is controlled by a grid pulse signal supplied to the grid to cathode circuit through a transformer 16. The secondary winding of this transformer 16 is connected to be biased by some voltage source denoted 17 and supplies the control grid signal for the valve V through a resistor 18 to the grid 13. Lines 19 supply a measure of the grid to cathode potential of the valve when no current flows through resistor 18.

The signal representing the potential drop across resistor 15 is supplied to an implifier-limiter 20 which produces an output signal of definite fixed amplitude when sufficient cathode current flows through the valve V. The signal supplied by lines 19, which represents the presence of the grid pulse, is supplied to amplifier-limiter 21 which also produces a signal of definite amplitude during periods when the grid pulse is present. The output signal from the amplifier-limiter 21 has the form of pulses contiguous in time with the grid pulse and is fed to a pulse extension unit 22 which is operative to extend the duration of these pulses for a short period (e.g. 60 electrical degrees at the grid pulse frequency) and the extended pulses supplied as output from the unit 22 are then inverted by an inverter unit 23 to produce an output signal suitable for comparison with that supplied by the amplifier-limiter 20. The simultaneous presence of an output from the unit 23 and the amplifier-limiter 20 is a condition detected by an AND indicator 24 which affords the detection of the fire-through condition. The schematic circuit shown in FIG. 1 also includes provision for the indication of a mis-fire condition. A potential divider 25 is connected between the anode 11 and the cathode 12 and has a plurality of tapping points along its length connected to the grids 14 as shown. This potentiometer and grid arrangement serves to control the voltage gradient in the valve V before conduction is permitted by the supply of a grid pulse from transformer 16. Under conditions of mis-fire no current is diverted from the potential divider 25 through the grids 14 and a signal supplied along output lines 26 and derived from a suitable tapping connection along divider 25 affords a measure of the anode to cathode potential of the valve V. If the amplitude of this signal supplied by the lines 26 exceeds a predetermined level when a grid pulse is supplied through transformer 16 the mis-fire condition must be indicated. Thus in FIG. 1 the signal supplied along lines 26 is fed through an amplifier-limiter 27 and the signal supplied along lines 19 is fed through an amplifier-limiter 28 to provide signals which are compared by an AND detector 29 to provide the necessary indication of the simultaneous existence of the signals. To avoid faulty indications arising from the normal firing delay of the valve, and particularly when the valve is switched on from an initially cold condition, the AND indication afforded by the detector 29 is supplied through a definite time relay 30 which is operative to provide the mis-fire indication only if the output from the AND detector 29 is sustained for a definite predetermined period, such for example as 200 microseconds in a conventional 50 cycle per second system.

As shown in the detailed circuit diagram of FIG. 2 circuit components common to the duties of amplifier-limiters 21 and 28 of the schematic arrangement of FIG. 1 can be used. The circuit shown in FIG. 2 utilizes transistors of the p-n-p type. The amplifier-limiter denoted 21/28 is shown to comprise a transistor 31 which has a grounded emitter. A diode 32 is connected between the base and emitter of the transistor as shown. This diode 32 operates to limit the positive rise of the base potential. The input signal to the limiter 21/28 is supplied through a potential divider network comprising resistors 33 and 34. The common connection between these resistors supplies a signal to the base of the transistor 31 and the other end of resistor 34 is connected to a negative bias potential source denoted $-V_1$. The output signal from the amplifier-limiter 21/28 is supplied from the collector of the transistor 31 which is further connected by a resistor 35 to the same negative potential source $-V_1$.

In operation, the input signal to the amplifier-limiter 21/28 is normally negative and accordingly the base of the transistor 31 is held negative so that the collector emitter circuit is conductive and the output from the limiter therefore at a near zero value. When the positive grid pulse controlling the firing of the valve V is supplied by the transformer 16 then, depending upon the relative resistances of the resistors 33 and 34 and the bias potentials of the circuit, the base of the transistor 31 may be driven positive by an amount limited by the action of the diode 32 but sufficient to cut off the transistor. Under these conditions the output signal from the limiter 21/28 falls to the low negative value $-V_1$. Thus when the grid pulse supplied to the valve V is on, a strongly negative output pulse is provided by the limiter 21/28.

The amplifier limiter 27 consists of components similar to those of the limiter 21/28 and is similarly operative to provide an output signal which is normally at a near zero value but which falls to the value $-V_1$, when the excess voltage input control signal is supplied from the valve circuit. The AND detector 29 merely consists of the diode 36. In the event that the output signal from the amplifier-limiter 27 tends to be strongly negative by the action just described diode 36 will prevent this if transistor 31 is allowed to conduct. However, diode 36 will be ineffective if the output from the limiter 21/28 is strongly negative as well. Thus the output signal supplied to the relay 30 is only strongly negative when the appropriate combination of over-positive inputs is applied to the limiters 21/28 and 27 simultaneously.

The relay 30 comprises a transistor 37 having an earthed emitter and a base connected to the common connection of two resistors 38 and 39 which form a potential divider. The input signal is supplied to one end of this potential divider and the other end of the potential divider is connected to a positive potential source $+V_2$. The value of $V_2$ is adjusted so that when the strongly negative signal is supplied as input the collector emitter circuit of the transistor becomes conductive and the output signal of the whole system is derived from the collector of the transistor 37. In this relay a time delay feature is provided by the action of capacitor 40 connected between the input to the relay and the emitter of the transistor 37.

The action of this capacitor 40 is to slow the establishment of the strongly negative input signal, so that a signal duration less than a prescribed value will not operate the relay. The supply of a "mis-fire" signal is represented in the figure by operation of the relay, i.e. by turn-on of transistor 37.

The amplifier limiter 20 also consists of components similar to those of limiters 21/28 and 27 and is also operative to provide an output signal which is at a near zero value for zero cathode current, but which falls to a strongly negative value when cathode current is in excess of a small fraction, say 5%, of normal. The output signal from the limiter 20 is supplied to an AND detector 24 which consists of a transistor 41 having an earthed emitter and a base connected to the common connection of two resistors 42 and 43 which form a potential divider. The input signal is supplied to one end of this potential divider and the other end of the potential divider is connected to a positive potential source $+V_2$. The value of $V_2$ is adjusted so that when the strongly negative signal is supplied as input the collector emitter circuit of the transistor 41 becomes conductive, which condition can be applied to derive a "fire-through" indication signal from the collector circuit of the transistor. However, this operation is conditioned by the action of unit 22/23 which performs the functions of units 22 and 23 of FIG. 1 and is controlled by the output signal from the limiter 21/28. Unit 22/23 includes a transistor stage which is operative to perform the pulse extension function and a second transistor stage which is operative to perform the inverter function. The pulse extension is performed by transistor 44 which has a capacitor 45 connected between its emitter and earth. The collector of the transistor is connected to a source of potential $-V_1$ through a resistor 46. The input to the unit 22/23 is applied to the base of the transistor 44 and the output is derived from the emitter of the transistor. In operation, the negative going pulses applied to the base of the transistor cause the capacitor 45 to acquire a negative charge which results in the supply of a negative output signal for the duration of the input pulse and a small following period. The inverter stage of the unit comprises transistor 47 having an earthed emitter and a base connected to the common connection between two resistors 48 and 49 which form a potential divider. The output signal from the emitter of transistor 44 is supplied to one end of this potential divider and the other end of the potential divider is connected to a positive potential source $+V_2$. In the absence of a negative charge across capacitor 45 the base potential of transistor 47 is positive and transistor 47 is thereby ineffective in preventing the strongly negative output signals supplied by the limiter 20 from reaching the AND detector 24. However, when the capacitor 45 has its negative charge and this negative charge is sufficiently strong to apply a negative signal to the base of transistor 47 this transistor can conduct to prevent its collector from having a strongly negative value. Thus as the collector 47 is connected to the input to the AND detector 24 the unit 22/23 and the limiter 20 are caused to co-operate in the AND decision of the unit 24.

If required some special means may be provided such as an electromagnetic counter or a bi-stable circuit requiring manual reset in order to preserve the mis-fire and fire-through indications in the event that these indications are intermittent.

What I claim as my invention and desire to secure by Letters Patent is:

1. Apparatus for the detection of fire-through in a mercury arc converter valve in a broad pulse system, said valve including an anode, a control grid and a cathode, comprising first circuit means connected between the grid and cathode of the valve for producing a first electrical signal representing a negative control grid pulse on the valve, second circuit means connected to said first circuit means for producing a second electrical signal in response to said first electrical signal and which continues for a period after said negative control grid pulse has ceased, said period being in excess of the converter's normal commutation time, third circuit means, including current responsive threshold means, connected to the cathode of the valve for producing a third electrical signal indicative of a cathode current greater than the threshold value of said current, said threshold value being a small fraction of the normal cathode current of the valve, and detector means connected to said second and said third circuit means and responsive to said second and said third signals, and operative when these two signals are present simultaneously.

2. Apparatus according to claim 1, wherein said first circuit means include an amplifier limiter operative to limit the amplitude of said first electrical signal to a definite value while a said negative control grid pulse is present, and said second circuit means include a pulse extension unit operative to extend the duration of said first electrical signal by said period in excess of the converter's normal commutation time and an inverter unit operative to invert the polarity of the output signal from said pulse extension unit, the so-inverted signal defining said second electrical signal.

3. Apparatus according to claim 1, wherein said third circuit means include an amplifier limiter operative to limit the amplitude of said third electrical signal to a definite value when said cathode current greater than the said threshold value is present.

4. Apparatus for the detection of mis-fire and fire-through in a mercury arc converter valve in a broad pulse system, said valve including an anode, a control grid and a cathode, comprising first comparator means including first circuit means connected between the anode and the cathode of the valve for producing a first electrical signal representing the magnitude and polarity of the anode-to-cathode voltage of the valve, second circuit means for producing a second electrical signal representing the magnitude and polarity of the anode-to-cathode voltage of the valve, second circuit means for producing a second electrical signal representing the magnitude and polarity of the minimum anode-to-cathode voltage normally required to fire the valve, and third circuit means connected to said first and second circuit means and responsive to the relative magnitudes and polarities of said first and said second electrical signals, said second and third circuit means defining a first amplifier limiter circuit operative to produce a third electrical signal when said anode-to-cathode voltage of the valve is more positive by a predetermined amount than said minimum anode-to-cathode voltage normally required to fire the valve; second comparator means including fourth circuit means connected between the grid and cathode of the valve for producing a fourth electrical signal representing the magnitude and polarity of the grid-to-cathode voltage of the valve, fifth circuit means for producing a fifth electrical signal representing the magnitude and polarity of the minimum grid-to-cathode voltage normally required to fire the valve, and sixth circuit means connected to said fourth and said fifth circuit means and responsive to the relative magnitudes and polarities of said fourth and said fifth electrical signals, said fifth and sixth circuit means defining a second amplifier limiter circuit operative to produce a sixth electrical signal indicative of said relative magnitudes and polarities of said fourth and said fifth electrical signals; seventh circuit means connected to said sixth circuit means for producing a seventh electrical signal in response to said sixth electrical signal and which continues for a period after cessation of a negative control grid pulse, said period being in excess of the converter's normal commutation time; eight circuit means, including current responsive threshold means and defining a third amplifier limiter circuit, connected to the cathode of the valve for supplying an eight electrical signal whose amplitude is limited to a definite value indicative of a cathode current in excess of the threshold value of said current, said threshold value being a small fraction of the normal cathode current of the valve; first detector means connected to said third and said sixth circuit means to respond to said third and said sixth electrical signals and operative when said third and said sixth electrical signals simultaneously have conditions indicating respectively an anode-to-cathode and a grid-to-cathode voltage in excess of the respective normal minimum voltages for firing the valve and of the requisite polarity therefor; relay means, including time delay means, connected to said first detector means so as to be responsive to the operation of said first detector means when said operation is sustained for a period in excess of the normal firing delay of the valve; and second detector means connected to said seventh and said eighth circuit means to respond to said seventh and said eighth electrical signals and operative when said last-mentioned signals are present simultaneously.

5. Apparatus according to claim 4, including means, connected to the output of said relay means, for preserving an intermittent output signal from said relay means.

6. Apparatus according to claim 4, wherein said signal preserving means comprise an electro-magnetic counter.

7. Apparatus according to claim 4, wherein said signal preserving means comprise a bi-stable circuit.

8. Apparatus according to claim 1, including means, connected to the output of said detector means, for preserving an intermittent output signal from said detector means.

9. Apparatus according to claim 8, wherein said signal preserving means comprise an electro-magnetic counter.

10. Apparatus according to claim 8, wherein said signal preserving means comprise a bi-stable circuit.

No references cited.